United States Patent (10) Patent No.: US 6,648,395 B2
Hoshino (45) Date of Patent: Nov. 18, 2003

(54) VEHICLE REAR SEAT

(75) Inventor: Akihiko Hoshino, Ayase (JP)

(73) Assignee: Johnson Controls Automotive Systems Corporation (JP)

( * ) Notice: Subject to any disclaimer, the term of this patent is extended or adjusted under 35 U.S.C. 154(b) by 0 days.

(21) Appl. No.: 10/097,238

(22) Filed: Mar. 13, 2002

(65) Prior Publication Data

US 2002/0140270 A1 Oct. 3, 2002

(30) Foreign Application Priority Data

Mar. 28, 2001 (JP) ........................................ 2001-092657

(51) Int. Cl.[7] ................................................. B60N 2/36
(52) U.S. Cl. ............... 296/66; 297/378.12; 297/188.04; 297/124; 296/69
(58) Field of Search ........................... 297/188.04, 146, 297/15, 125, 126, 378.12, 119, 124; 296/65.09, 66, 69; 403/291

(56) References Cited

U.S. PATENT DOCUMENTS

| 2,949,331 | A | * | 8/1960 | Himka | 296/66 |
| 3,011,822 | A | * | 12/1961 | May et al. | 296/66 |
| 3,121,586 | A | * | 2/1964 | Colenso | 296/66 |
| 3,292,970 | A | * | 12/1966 | Wilson | 296/66 |
| 3,357,737 | A | * | 12/1967 | Vettel et al. | 296/66 |
| 4,979,772 | A | * | 12/1990 | Carey et al. | 296/66 |
| 5,524,959 | A | * | 6/1996 | Scott | 296/39.1 |
| 6,030,044 | A | * | 2/2000 | Kosugi et al. | 297/440.16 |
| 6,129,404 | A | * | 10/2000 | Mattarella et al. | 296/65.09 |
| 6,318,784 | B2 | * | 11/2001 | Nishide | 297/125 |
| 6,406,084 | B1 | * | 6/2002 | de Campos et al. | 296/66 |
| 6,464,297 | B2 | * | 10/2002 | Garrido et al. | 297/354.13 |
| 6,494,533 | B1 | * | 12/2002 | Böhler | 297/188.05 |

FOREIGN PATENT DOCUMENTS

EP 492281 A2 * 7/1992 ............ B60N/2/32

* cited by examiner

Primary Examiner—Peter R. Brown
Assistant Examiner—Steve D'Adamo
(74) Attorney, Agent, or Firm—Foley & Lardner

(57) ABSTRACT

A vehicle rear seat is provided with a seat cushion, a seat back connected to the seat cushion and foldable from an upright position to a forwardly folded position over the seat cushion, and a retainer board mounted to a rear surface of the seat back for tilting movement. The seat back has a body portion and a decorative cover placed over the body portion. The decorative cover has an upper decorative cover component and a rear decorative cover component. The retainer board includes a core material, a decorative cover composed of one cover element and the other cover element opposing to the one cover element to enclose the core material, and a mount segment extending from the retainer board and connected to the rear decorative cover component of the seat back. The mount segment serves as a hinge to enable the retainer board to be placed in an inoperative rest position and in an operative unfold position.

6 Claims, 6 Drawing Sheets

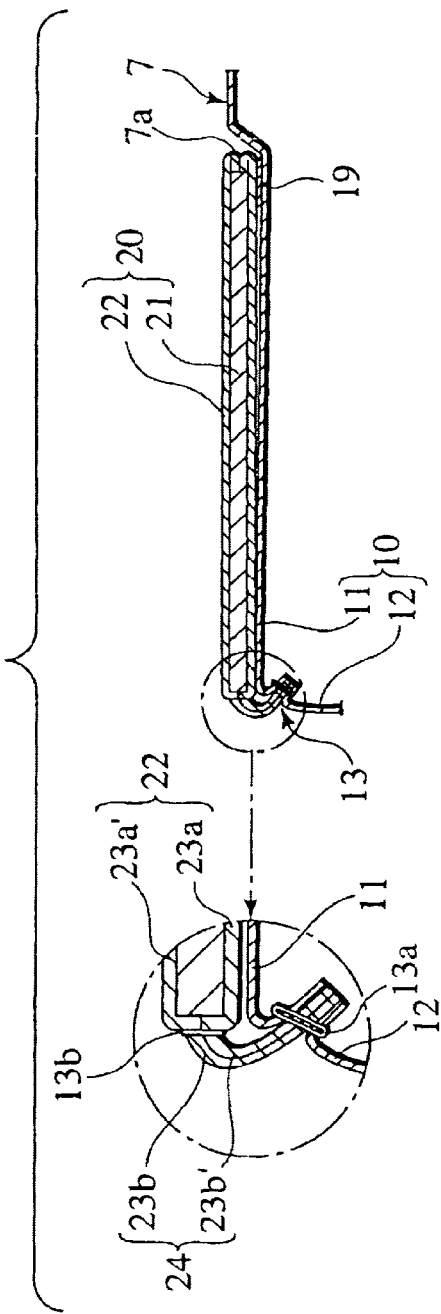
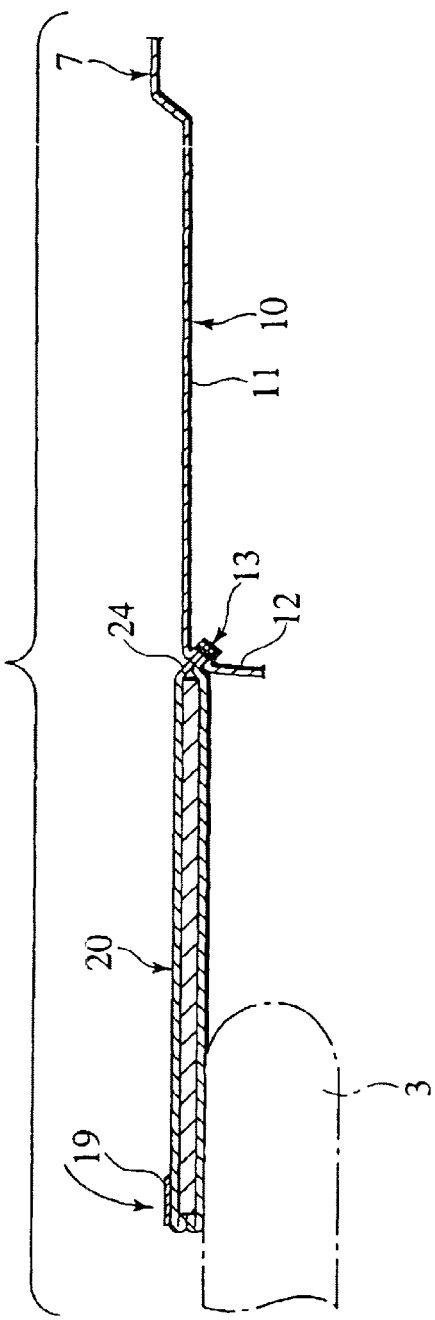

FIG.4
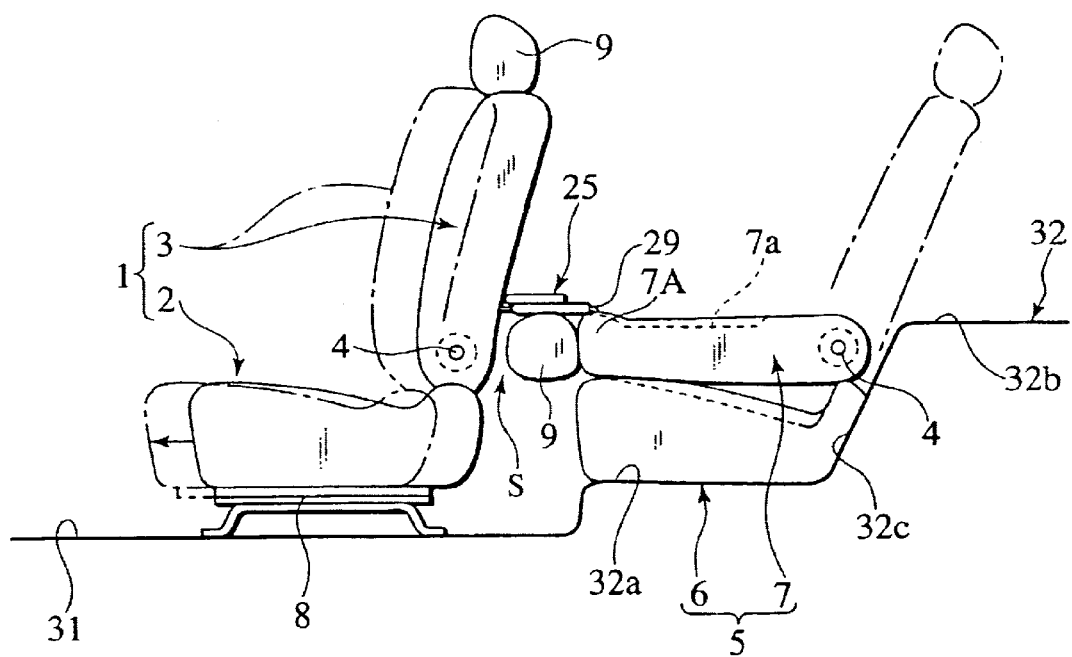
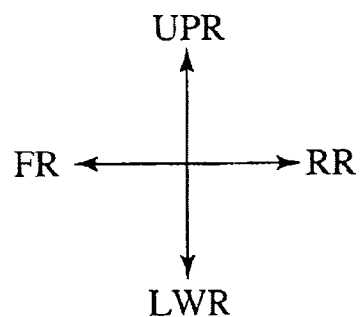

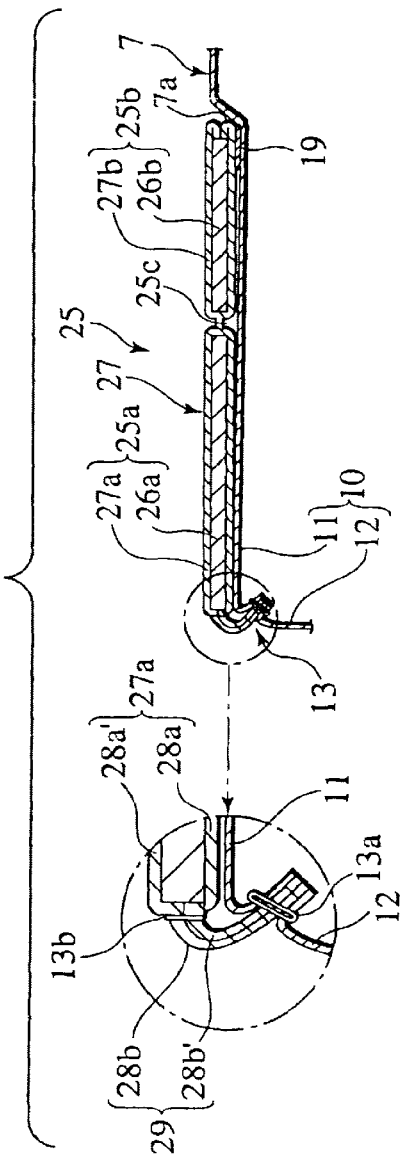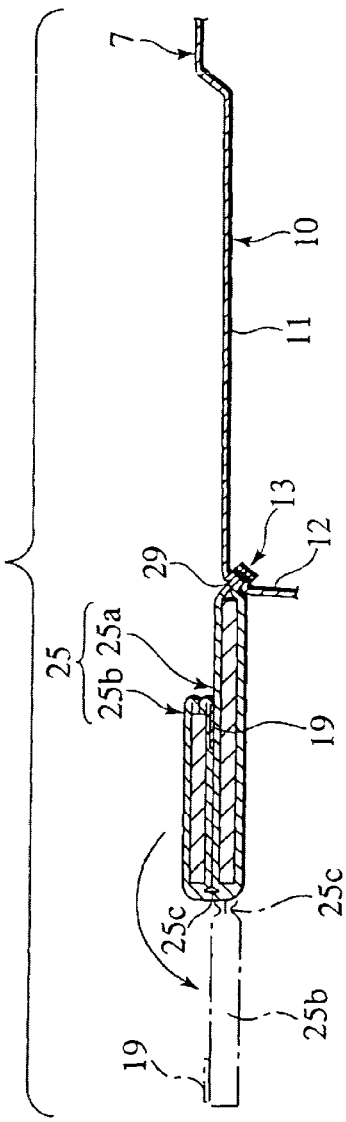
FIG.5A
FIG.5B

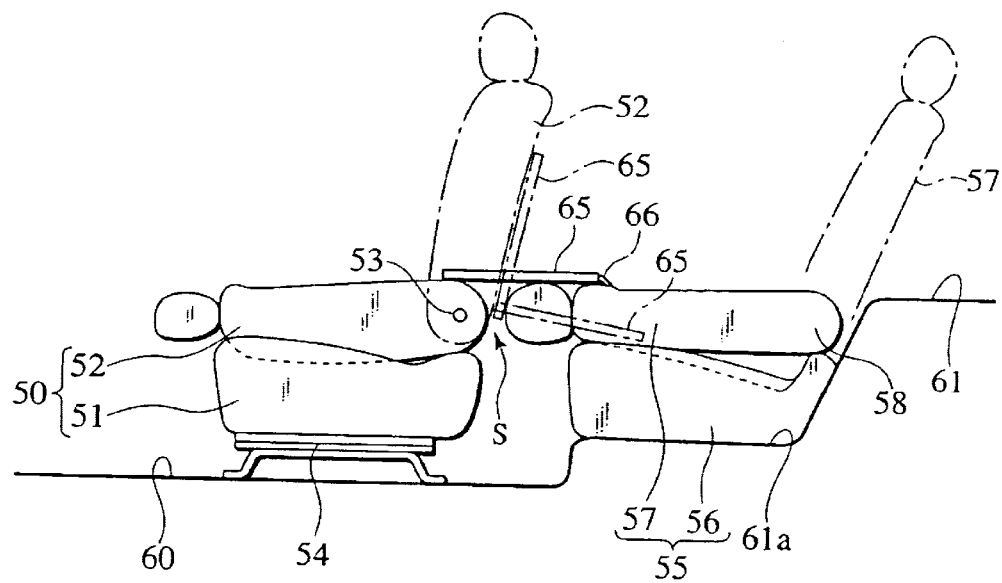
FIG.6
CONVENTIONAL

VEHICLE REAR SEAT

BACKGROUND OF THE INVENTION

The present invention relates to a vehicle rear seat and, more particularly, to a vehicle rear seat, whose rear surface carries a retainer board.

An attempt has been undertaken to develop a vehicle provided with seats of a foldable seat back type as disclosed in FIG. 6 which shows an example of a specifically arranged seat structure in its vehicle compartment. The vehicle compartment has a vehicle body floor 60 on which front seats (not shown), which functions as a driver's seat and a driver's assistant seat, are mounted. A first rear seat 50 is mounted rearward of the front seats, and a second rear seat 55 is mounted rearward of the first rear seat 50. The vehicle body floor 60 is continuous with a luggage floor 61 formed at an area rearward of the second rear seat 55. The first and second rear seats 50, 55 include respective seat cushions 51, 56, and respective seat backs 52, 57 which are mounted to rear edges of the respective seat cushions 51, 56, respectively. The seat backs 52, 57 have their lower ends mounted with pivot shafts 53, 58 through which the seat backs 52, 57 are pivotally supported with respective angular adjustment mechanisms (not shown) and are foldable from respective upright positions, shown by phantom lines in FIG. 6, to respective substantially horizontal fold positions shown by respective solid lines in FIG. 6. The first rear seat 50 is mounted on a seat adjuster 54, fixedly mounted on the vehicle body floor 60, for forward and rearward movements in a longitudinal direction of the vehicle. The second rear seat 55 is fixedly secured onto a stepped area 61a formed forwardly of the luggage floor 61.

With such a structure of the rear seat, when locating a luggage in an internal space in the luggage floor 61, the seat back 57 of the second rear seat 55 is folded forward to compel the same in a substantially horizontal fold position. In addition to the folding movement of the seat back 57, the seat back 52 of the first rear seat 50 is also folded forward in its fold position. Under such a condition, the first rear seat 50 is operated to slide in the forward and rearward directions using the seat adjuster 54 so as to preclude a head rest of the second rear seat 55 from being brought into abutting contact with the first rear seat 50. FIG. 6 shows such a state where both the seat backs 52, 57 of the first and second rear seats 50, 55 are folded forward to compel the rear surfaces of the seat backs 52, 57 to be aligned in substantially the same plane as the luggage floor 61. Under this circumstance, accordingly, the vehicle compartment has a continuous large internal spacing above the luggage floor 61 and the first rear seat 50, enabling various articles and an elongated luggage to be located over the luggage floor 61 and the rear surfaces of the first and second rear seats 50, 55.

Under a folded condition shown in FIG. 6, a spacing S is formed between both the rear seats 50, 55, and the luggage placed on the rear surfaces of the respective seat backs 52, 57 tends to drop onto the floor 60 through the spacing S. To cope with such a phenomenon in the related art structure, there are some instances where a retainer board 65 is mounted to the rear surface of one of the seat backs 52, 57 by means of a hinge member 66 with a view to closing the spacing S. The retainer board 65 is comprised of a structure described below in detail. That is, in a case where the retainer board 65 is mounted to the second rear seat 55, an upper end of the retainer board 65 is connected to an upper area of the rear surface of the seat back 57 by means of the hinge member 66, with a lower end of the retainer board 65 being attached to the rear surface of the seat back 57 in a detachable manner via a simple lock mechanism (not shown). On the other hand, in a case where the retainer board 65 is mounted to the rear surface of the first rear seat 50, the retainer board 65 is connected to a lower end of the rear surface of the seat back 52 of the first rear seat 50 by means of the hinge member, with the upper end of the retainer board 65 being attached to the rear surface of the seat back 52 in the detachable manner via the simple lock mechanism (not shown). Incidentally, the location of the hinge member 66, i.e. the mounting position of the retainer board 65 relative to the first and second rear seats 50, 55 may be suitably settled as an upper hinge as shown by a solid line in FIG. 6 or a lower hinge as shown by a phantom line in FIG. 6.

SUMMARY OF THE INVENTION

The aforementioned measures for the spacing between the first and second rear seats are undertaken by closing the spacing S upon unfolding the retainer board 65 by means of the upper or lower hinge member 66 to compel the retainer board 65 to be placed on the seat back 52 or 57. However, the aforementioned structure encounters various phenomena as will be described below. First, since the seat backs 52, 57 of the rear seats 50, 55 have outer appearances to be laminated with decorative covers involving the rear surfaces thereof, when mounting the retainer board 65 to the relevant seat back in a subsequent step, it has been a usual practice for a core member, such as a back frame contained in the relevant seat back, to be preliminarily mounted with a bracket for mounting the retainer board. Under such a circumstance, the presence of the decorative cover, which encloses the various component parts of the seat back, disables the location of the mounting bracket from being visually found, causing a degraded workability for fixing the retainer board 65 to the mounting bracket of the seat back via the hinge member 66 using fixtures screws. This results in an increase in the number of assembling steps required for the retainer board. In the presence of the retainer board mounted to the seat back, further, a portion of the hinge member is visible from outside and such a structure fails to provide an attractive outer appearance. In addition, it has been a usual practice for such a retainer board to be made of a plate like core material, such as plastic plate, which is covered with a bag-shaped decorative cover to provide a relatively simple structure that needs a troublesome selection for a fixture element suitable as the hinge member 66. With such a structure in the related art practice as in the structure shown in FIG. 6, further, when unfolding the retainer board 65, which is mounted to the first rear seat 50, onto the seat cushion 56 of the second rear seat 55, there is a need for the first rear seat 50 to be moved rearward using the seat adjuster 54 until the distal end of the retainer board 65 gets at the upper surface of the seat cushion 56, with a resultant degraded usage of the retainer board.

The present invention has been made with the above studies and has an object to provide a vehicle rear seat easy to be assembled while providing its attractive outer appearance and improved usage.

To achieve the above object, according to one aspect of the present invention, there is provided a vehicle rear seat comprising: a seat cushion; a seat back connected to the seat cushion and foldable from an upright position to a forwardly folded position over the seat cushion, the seat back having a body portion and a decorative cover placed over the body portion, the decorative cover having an upper decorative cover component and a rear decorative cover component; and a retainer board mounted to a rear surface of the seat back for tilting movement. The retainer board includes a core material, a decorative cover composed of one cover element and the other cover element opposing to the one cover element to enclose the core material, and a mount segment extending from the retainer board and connected to the rear decorative cover component of the seat back. The mount segment serves as a hinge to enable the retainer board to be placed in an inoperative rest position and in an operative unfold position.

Other and further features, advantages, and benefits of the present invention will become more apparent from the following description taken in conjunction with the following drawings.

BRIEF DESCRIPTION OF THE DRAWINGS

FIGS. 3A and 3B are enlarged cross sectional views illustrating parts of the vehicle rear seat shown in FIG. 2;

FIG. 4 is a typical structural view illustrating a vehicle rear seat of a second preferred embodiment according to the present invention;

FIGS. 5A and 5B are enlarged cross sectional views illustrating parts of the rear vehicle seat shown in FIG. 4; and FIG. 6 is a typical structural view illustrating a vehicle rear seat of a related art for describing various difficulties encountered in the related art.

DETAILED DESCRIPTION OF THE PREFERRED EMBODIMENTS

Figure 1:
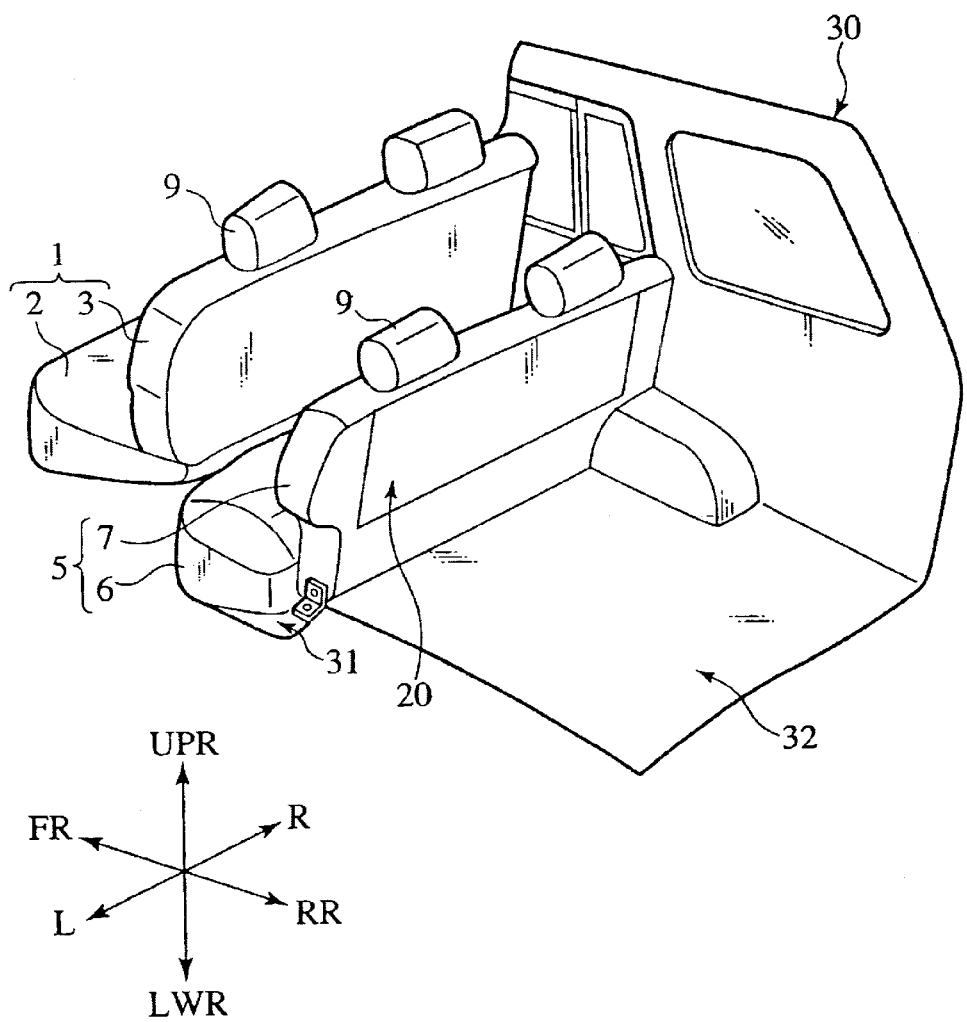
FIG. 1 is a typical structural view illustrating a vehicle compartment mounted with a vehicle rear seat of a first preferred embodiment according to the present invention.
Figure 2:
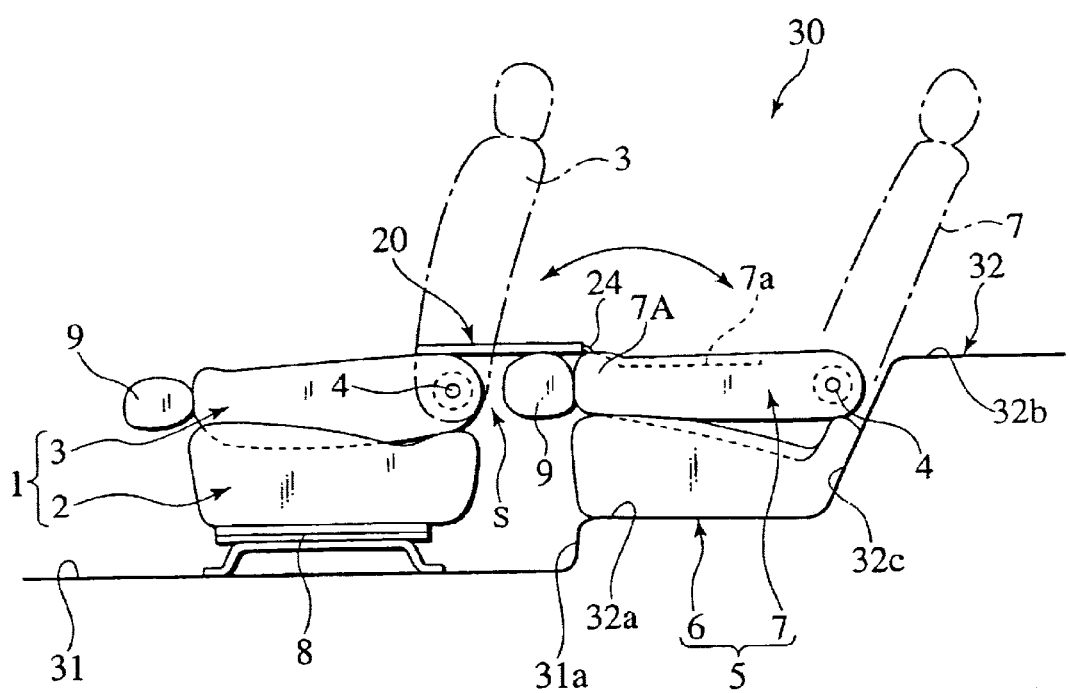
FIG. 2 is a typical structural view of the rear seats shown in FIG. 1, as viewed from a side portion.

To describe the present invention more in detail, a vehicle rear seat of preferred embodiments of the present invention will be explained below with reference to the accompanied drawings, wherein FIG. 1 is a typical view illustrating a vehicle compartment having vehicle seats with a seat back of each vehicle rear seat standing upright, FIG. 2 is a typical side view illustrating the vehicle rear seats with the seat backs folded forward in substantially, horizontally folded positions, and FIGS. 3A and 3B are cross sectional views of parts of the vehicle seat shown in FIG. 1. FIG. 4 and FIGS. 5A and 5B show a vehicle rear seat of a second preferred embodiment according to the present invention, wherein symbols FR, RR, L, R, UPR and LWR refer to "forward", "rearward", "left", "right", "upper" and "lower" of a vehicle, respectively.

Referring now to FIGS. 1 and 2, a vehicle compartment 30 of the vehicle has a vehicle body floor 31 and a luggage floor 32 which are continuously formed. Mounted on the vehicle body floor 31 are front seats (not shown) located in front areas of the vehicle compartment 30 for a vehicle driver and a driver assistant, a first rear seat 1 located rearward of the front seats, and a second rear seat 5 located rearward of the first rear seat 1. The luggage floor 32 is located in an area rearward of the second rear seat 5.

The first and second rear seats 1 and 5 are comprised of seat cushions 2, 6, and seat backs 3, 7 mounted at rear distal ends of the seat cushions 2, 6 and having their upper end located with head rests 9, 9, respectively. Lower ends of the seat backs 3, 7 have horizontally extending pivot shafts 4, 4, respectively, which are pivotally supported with a tilting angle adjustment mechanism (not shown) to compel the seat backs 3, 7 to be foldable between respective upright positions as shown by phantom lines in FIG. 2 and a substantially, horizontally folded position as shown by solid lines in FIG. 2.

As shown in FIG. 2, the first rear seat 1 is mounted on a seat slide mechanism 8, which is fixedly secured to the vehicle body floor 31, for sliding movement in forward and rearward directions to assume a selected position in a longitudinal direction of the vehicle compartment 30. As shown in FIG. 2, the luggage floor 32 has a lower step floor component 32a connected via an upright portion 31a of the vehicle body floor 31, a higher step floor component 32b connected to the lower step floor component 32a via a slanted connecting portion 32c, with the lower step floor component 32a receiving the seat cushion 6 of the second rear seat 5.

The higher step floor component 32b is displaced from the lower step floor component 32a by such a height to allow a rear surface of the seat back 7 in its folded position to be aligned on substantially the same horizontal plane as the second step floor component 32b of the luggage floor 32 for a reason as will be described later. As best shown in FIG. 2, further, the presence of the seat back 3 of the first rear seat 1 held in the forwardly folded position allows a rear surface of the seat back 3 to be aligned on substantially the same horizontal plane as the rear surface of the seat back 7 of the second rear seat 5 and the second step floor component 32b of the luggage floor 32. Under such a condition, the vehicle compartment 30 has a large volume of continuous empty space defined between an inner wall of the vehicle compartment 30 and the horizontally aligned rear surfaces, of the first and second rear seats 1, 5, and the second step floor component 32b of the luggage floor 32, enabling an elongated luggage or other various articles to be placed over the rear surfaces of the first and second seat backs 3 and 7.

Further, as viewed in FIGS. 1, 2, 3A and 3B, a rear upper end 7A of the seat back 7 of the second rear seat 5 has a laterally extending retainer board 20 which is connected to the rear upper end 7A and pivotally supported with a mount segment 24 for rotational movement in forward and rearward directions of the vehicle body at the rear surface of the seat back 7. In an unfolded condition shown in FIG. 2 with the seatbacks 3, 7 of the first and second rear seats 1, 5 being also held in the folded states, the retainer board 20 is laid across these two seat backs 3, 7 to close a laterally extending spacing S formed between these components.

In particular, the seat cushions 2, 6 and the seat backs 3, 7 have fundamental structures which include respective frames that retain respective shock absorbing pads which are laminated with decorative covers. The decorative covers are joined together to form unitary structures by sewing various portions of the decorative covers. More particularly, in examples of the seat backs 3, 7, at least front decorative cover components, rear decorative cover components, upper decorative cover components and lower decorative cover components are sewed to form joined unitary structures.

That is, as shown in FIGS. 3A and 3B, the seatback 7 has a decorative cover 10 which is comprised of a rear decorative cover component 11 and an upper decorative cover component 12 which are sewed to one another at a sewing area 13. Further, the retainer board 20 includes a core material 21 which is composed of a plate member made of a plastic resin, plywood or corrugated cardboard, etc. Also, it is desired for a decorative cover 22 of the retainer board 20 to use the same materials as those used in the decorative covers 10 of the seatback 7 to provide an improved appearance. As best seen in FIGS. 1 and 2, a rear wall of the second rear seat 7 is preferably formed with a laterally extending rectangular concave portion 7a to accommodate therein the retainer board 20 in substantially the same plane as the rear surface of the second rear seat 7.

More particularly, FIGS. 3A and 3B are enlarged views illustrating the structures of the retainer board 20 and the associated concave portion 7a formed at the rear wall of the seat back 7 of the second rear seat 5 in case that the seat back 7 is typically folded. FIG. 3A shows a condition in which the retainer board 20 is received in the concave portion 7a in the folded state, and FIG. 3B shows a condition in which the retainer board 20 is unfolded forward to allow a lower end thereof to be placed on the rear end portion of the seat back 3 of the first rear seat 1. A feature of the rear seat structure concerns (1) the presence of the retainer board 20 formed with the mount segment 24 composed of an extension of an upper distal end of the decorative cover 22, (2) the presence of the mount segment 24 and the decorative cover 10 which are mutually sewed to one another in a unitary structure, and (3) the absence of stepwise difference between the rear surface of the retainer board 20 and the rear surface of the seat back 7 of the second rear seat 5, when the retainer board 20 is received in the concave portion 7a.

That is, the retainer board 20 is comprised of the core material 21 and the decorative cover 22 composed of top and bottom cover elements 23a, 23a' formed in an envelope. The decorative cover 22 has extensions 23b, 23b' extending upward from respective upper ends of the top and bottom cover elements 23a, 23a', with the extension 23b, 23b' forming the aforementioned mount segment 24. As best shown in FIG. 3A, the extensions 23b, 23b' have respective base portions which are mutually sewed as at 13b to close the decorative cover 22, with remaining portions of the extensions 23b, 23b' serving as the mount segment 24. The mount segment 24 has an upper distal end which is sandwiched between distal ends of the rear and upper decorative cover components 11, 12 and sewed at a joint portion 13a between the rear and upper decorative cover components 11, 12 to form the unitary structure with the decorative cover 10. Accordingly, the retainer board 20 is attached to the decorative cover 10 without adding a particular sewing portion. With such a structure of the flexible mount segment 24, the retainer board 20 has an inoperative position, shown in FIG. 3A, wherein the retainer board 20 rests in the associated concave portion 7a of the seat back 7 of the second rear seat 5, and an operative position, shown in FIG. 3B, wherein the retainer board 20 is unfolded forward such that the lower end of the retainer board 20 rests on the rear surface of the first rear seat 3. Further, a lower end of the bottom cover element 23a, which faces the concave portion 7a of the seat back 7 of the second rear seat 5, of the retainer board 20 has a surface fastener 19 that is able to stick to the decorative cover component 11 formed in the concave portion 7a in a detachable manner.

Also, the present invention is not limited to a particular upper hinge structure of the retainer board 20, and it may be modified such that the retainer board 20 has a lower hinge structure as shown by the phantom line in FIG. 6. In this case, the mount segment 24 may be sewed to a sewing portion between a rear decorative component and a lower decorative component of the first rear seat 1.

With the structure discussed above, the retainer board 20 may be used in the similar way as in the related art practice such that, during the operative condition, the rear board 20 closes the laterally extending spacing S, formed between the first rear seat 1 and the second rear seat 5, to allow the articles or the luggage to be rest on the retainer board 20. In contrast, during the inoperative condition, the retainer board 20 is suspended from the mount segment 24 to compel the bottom cover element 23a to be aligned along the rear surface of the rear decorative component 11 of the concave portion 7a and is caused to rest therein in an attractive outer appearance. When using the retainer board 20, the seat back 7 is folded forward. Then, the lower end of the retainer board 20 is detached from the rear decorative cover component 11 and the retainer board 20 is unfolded in the forward direction about a center of the mount segment 24 to allow the lower end of the retainer board 20 to rest on the seat back 3 of the first rear seat 1.

Next, FIGS. 4, 5A and 5B show a vehicle rear seat of a second preferred embodiment according to the present invention, with the same parts bearing the same reference numerals as those used in FIGS. 1 to 3B. Incidentally, FIG. 4 basically corresponds to FIG. 2, and FIGS. 5A and 5B basically correspond to FIGS. 3A and 3B, in which a seat back is folded.

In the second preferred embodiment shown in FIGS. 4, 5A and 5B, a retainer board 25 has a twofold structure that is able to rest in one of a folded, inoperative position shown in FIG. 5A and an unfolded, operative position shown in FIG. 5B. A feature of the retainer board 25 concerns (1) the presence of the retainer board 25 formed with a mount segment 29 composed of the extensions of the upper distal ends of a decorative cover 27, (2) the presence of the mount segment 29 and the decorative cover 10 which are mutually sewed to one another in a unitary structure, (3) the presence of a thin walled hinge 25c formed in a midway between the mount segment 29 and the distal end of the retainer board 25 to compel the same to fold double, and (4) the absence of stepwise difference between the rear surface of the retainer board 25 and the rear surface of the rear surface of the seat back 7 of the second rear seat 5, when the retainer board 25 is received in the concave portion 7a.

More particularly, the retainer board 25 is comprised of an upper board component 25a, extending downward from the mount segment 29, and a lower board component 25b that is interconnected with the upper board component 25a via the thin walled hinge 25c. To this end, a core material 26 is comprised of an upper core material component 26a for the upper board component 25a and a lower core material component 26b for the lower board component 25b. The decorative cover 27 is comprised of an upper decorative cover component 27a, which encloses the upper core component 26a, and a lower decorative cover component 27b that encloses the lower core component 26b, with the upper and lower decorative cover components 27a, 27b being made of the same material as top and bottom cover elements 28a, 28a', which are formed in an envelope, and connected to one another by means of the thin walled hinge 25c. The thin walled hinge 25c is formed with a relevant sewed part of the decorative cover 27. The decorative cover component 27a includes the top and bottom cover elements 28a, 28a' and extensions 28b, 28b' extending upward from upper distal ends of the top and bottom cover elements 28a, 28a' to form the mount segment 29.

As best shown in FIG. 5A, the upper distal ends of the top and bottom cover elements 28a, 28a' are joined to one another by sewing as at 13b to close the upper decorative cover component 27a, with the extensions 28b, 28b' extending upward from the sewed portion 13b serving as the mount segment 29. The mount segment 29 has an upper distal end which is sandwiched between distal ends of the rear and upper decorative cover components 11, 12 and sewed at a joint portion 13a between the rear and upper decorative cover components 11, 12 to form the unitary structure with the decorative cover 10. Accordingly, the retainer board 25 is attached to the decorative cover 10 without adding a particular sewing portion.

With such a structure of the flexible mount segment 29, the retainer board 25 has an inoperative position, shown in FIG. 5A, wherein the retainer board 25 rests in the associated concave portion 7a of the seat back 7 of the second rear seat 5, and an operative position, shown in FIG. 5B, wherein the upper board component 25a of the retainer board 25 is unfolded forward while the lower board component 25b is folded over the upper board component 25a. When it is desired to extend the retainer board 25 in an increased length, the lower board component 25b is unfolded forward by means of the thin walled hinge 25c in a way as shown by a phantom line in FIG. 5B. Further, a lower end of the lower decorative cover component 27b, which faces the concave portion 7a of the seat back 7 of the second rear seat 5, of the retainer board 25 has a surface fastener 19 that is able to stick to the decorative cover component 11 formed in the concave portion 7a in a detachable manner. Also, the retainer board 25 may have a lower hinge structure in the same manner as described above with reference to the first preferred embodiment.

With the structure discussed above, the retainer board 25 has an advantage in that it has a short-length mode as shown by a solid line in FIG. 5B and an increased-length mode as shown by a phantom line in FIG. 5B. Additionally, the retainer board 25 has the same advantages as the first preferred embodiment discussed above.

It will now be understood from the foregoing description that, in accordance with the rear seat of the present invention, there is no extraneous feeling to occur because of the absence of the hinge member employed in the related art structure while providing improved workability in assembly and an attractive outer appearance with an enhanced fixing strength. Another important advantage of the rear seat of the present invention concerns a capability in obtaining an efficient use of a vehicle compartment and improved comfortable usage of the same.

Incidentally, it will be understood that the retainer board may be modified in various shapes to cope with the related rear seat. In addition, the rear seat is not limited to the bench type seat described above with reference to the preferred embodiments, and another type of rear seats such as separate type seats may be used.

The entire content of a Patent Application No. TOKUGAN 2001-92657 with a filing date of Mar. 28, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle rear seat comprising:

a seat cushion;

a seat back connected to the seat cushion and foldable from an upright position to a forwardly folded position over the seat cushion, the seat back having a body portion and a first decorative cover placed over the body portion, the first decorative cover having an upper decorative cover component and a rear decorative cover component; and a retainer board mounted to a rear surface of the seat back for tilting movement; and including a core material, a second decorative cover, which is composed of a top cover element and a bottom cover element opposing the top cover element to enclose the core material, and a mount segment which includes top and bottom extensions respectively extending from distal ends of the top cover element and the bottom cover element of the retainer board and respectively having distal ends which are sandwiched between the upper decorative cover component and the rear decorative cover component of the seat back, wherein a unitary structure is formed in such a manner that the distal ends of the top and bottom extensions, the upper decorative cover component of the seat back and the rear decorative cover component of the seat back are sewed to one another to enable the mount segment to serve as a hinge enabling the retainer board to be placed in an inoperative rest position and in an operative unfold position, while keeping the distal ends of the top and bottom extensions in a condition to be sandwiched between the upper decorative cover component and the rear decorative cover component.

2. A vehicle rear seat according to claim 1, wherein the seat back has a concave portion on the rear surface thereof, and the retainer board is located at the concave portion when the retainer board is placed in the inoperative rest position.

3. A vehicle rear seat according to claim 1, wherein the retainer board is fastened to the rear surface of the seat back when the retainer board is placed in the inoperative rest position.

4. A vehicle rear seat according to claim 1, wherein the retainer board is laid across the rear seat and a seat adjacent to the rear seat to close a spacing therebetween when the retainer board is placed in the operative unfold position.

5. A vehicle rear seat according to claim 1, wherein the retainer board includes a first board component, a second board component, and a thin walled hinge located between the first board component and the second board component to enable a twofold function.

6. A vehicle rear seat according to claim 5, wherein the thin walled hinge is formed with a joint portion of the one cover element and the other cover element of the retainer board.

* * * * *